Aug. 4, 1925.
J. H. CUNTZ
1,548,024
MEANS FOR DETECTING SUBMARINES AND OTHER INVISIBLE OBJECTS
Original Filed July 17, 1917   3 Sheets-Sheet 1
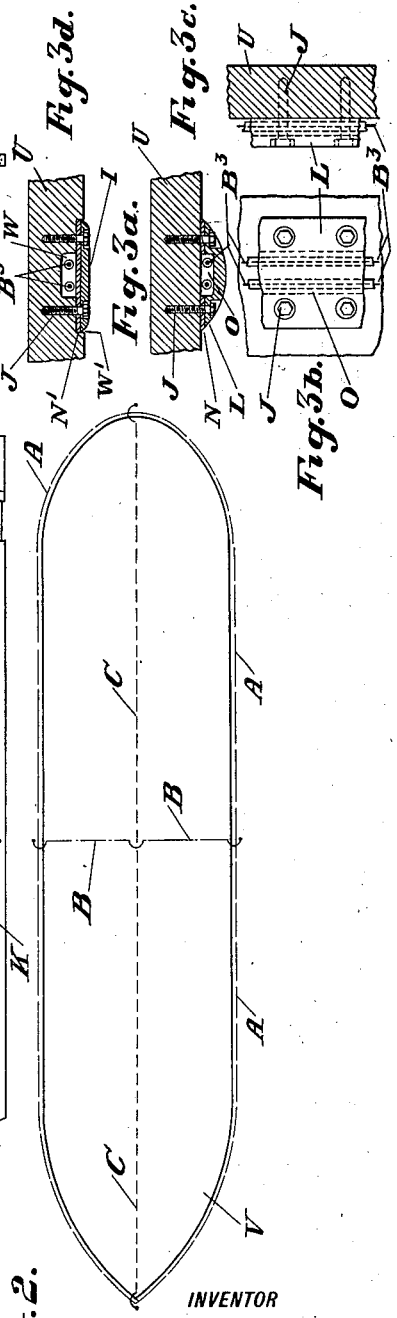
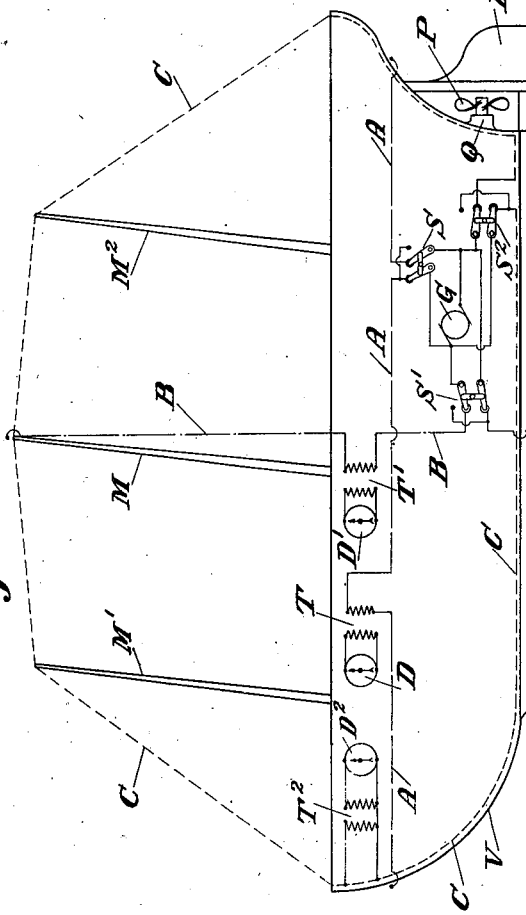
WITNESSES
INVENTOR
JOHN H. CUNTZ
BY
his ATTORNEY Aug. 4, 1925. 1,548,024
J. H. CUNTZ
MEANS FOR DETECTING SUBMARINES AND OTHER INVISIBLE OBJECTS
Original Filed July 17, 1917   3 Sheets-Sheet 2

WITNESSES:

INVENTOR
JOHN H. CUNTZ
BY
his ATTORNEY

Aug. 4, 1925.
J. H. CUNTZ
1,548,024
MEANS FOR DETECTING SUBMARINES AND OTHER INVISIBLE OBJECTS
Original Filed July 17, 1917    3 Sheets-Sheet 3
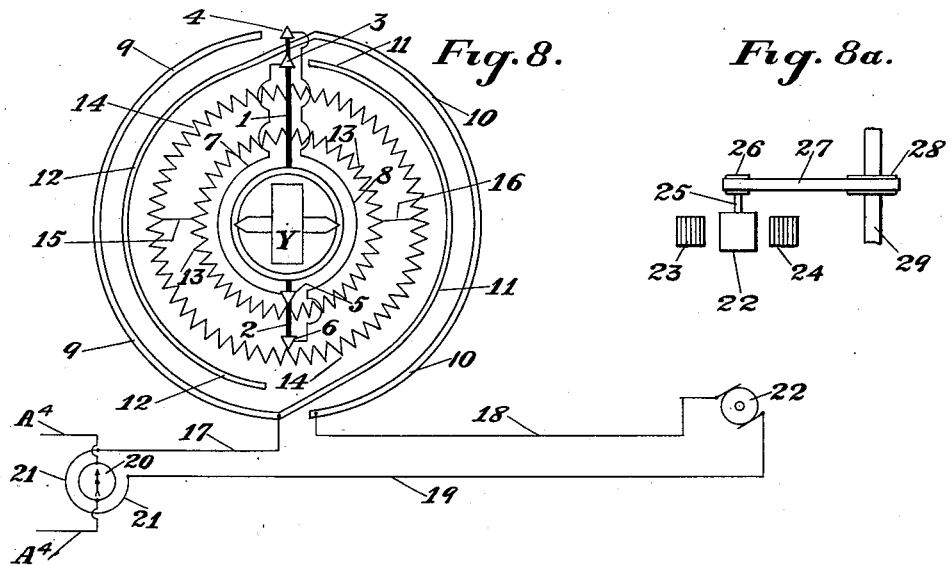
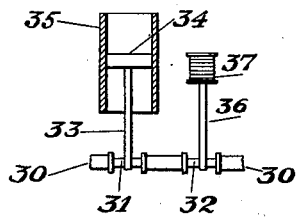
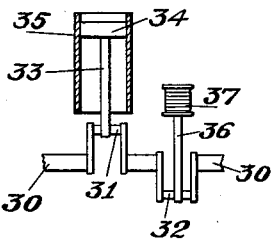
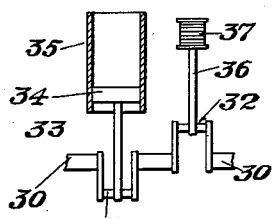
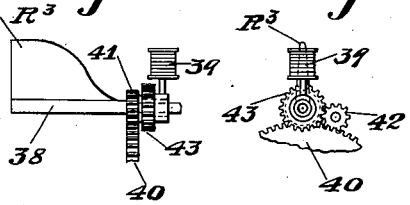
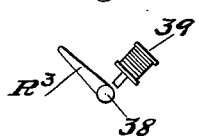
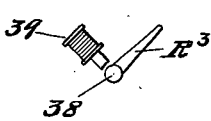
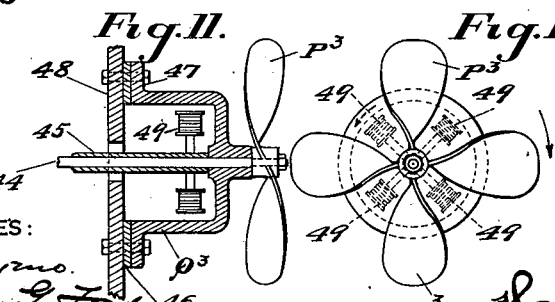
WITNESSES:
INVENTOR
JOHN H. CUNTZ
BY
his ATTORNEY Patented Aug. 4, 1925.

1,548,024

UNITED STATES PATENT OFFICE.

JOHN H. CUNTZ, OF HOBOKEN, NEW JERSEY.

MEANS FOR DETECTING SUBMARINES AND OTHER INVISIBLE OBJECTS.

Application filed July 17, 1917, Serial No. 181,014. Renewed June 5, 1925.

*To all whom it may concern:*

Be it known that I, JOHN H. CUNTZ, a citizen of the United States, and a resident of Hoboken, in the county of Hudson and State of New Jersey, have invented certain new and useful Improvements in Means for Detecting Submarines and Other Invisible Objects, of which the following is a specification, reference being had to the accompanying drawings, forming a part hereof.

My invention relates to means for detecting the presence of submarine vessels, submarine mines and other floating or submerged bodies, or bodies on the bottom of the sea, or otherwise.

More particularly my invention relates to electric circuits and other apparatus carried on a vessel or float, by means of which the presence of magnetic or metallic bodies can be detected at a distance, although my method may also be employed at a fixed station.

In one form of my invention I dispose electric circuits around the outside of a vessel, so as to enclose a large area, and to include the hull of the vessel inside the circuit. I may use one or more circuits, each having one or more turns, one arrangement being to have three circuits in planes at right angles to each other.

Electric currents may be sent through these circuits, and indicating or measuring instruments are connected to them to show variations in current caused by the presence of submarine vessels, mines or other foreign bodies.

When a direct current is caused to flow through any of these circuits, a magnetic field is created, and if the vessel is built of iron or steel, the magnetic field is greatly strengthened. This magnetic field spreads out from the vessel, and while its strength diminishes with increasing distance from the vessel, the large area of the circuit, the strength of the current flowing therein, which can be made as powerful as desired, and the magnetic material of the vessel, about which the circuits are disposed, combine to create a magnetic field of such strength that its influence extends to considerable distances. The electric circuit and the hull of the vessel constitute a great electromagnet. If a foreign magnetic body, such as a submarine boat or a mine, enters this field, it will cause a variation thereof, and hence cause changes in the currents in the circuits, which will be indicated on the detecting instruments.

If there is relative motion between the magnetic field surrounding the vessel and foreign conducting bodies, currents will be induced in the latter, even if they are not magnetic. These currents will react upon the original circuits, and cause changes in the currents therein, which will be indicated on the detecting instruments.

When an alternating current is caused to flow in any of these circuits, an alternating electro-magnetic field is created in the surrounding region, and if there are any conducting bodies in this region, electric currents will be induced in these bodies. These induced currents will react upon the original circuit, causing changes in the original current which will be indicated on suitable detecting instruments. Such foreign conducting bodies may be submarine vessels or mines, which will betray their presence by the changes in current caused in the detecting circuits on board the original vessel.

When the foreign body is of magnetic material it will cause changes in the alternating electro-magnetic field and hence in the currents in the original circuits, which changes will be indicated on the detecting instruments.

Even when, under normal conditions, there is no current in the detecting circuits on board the original vessel, the relative motion of this vessel and a foreign magnetic body, such as a submarine vessel or mine, will induce currents in the detecting circuits, which will be indicated on the detecting instruments.

In all cases when there is more than one circuit, the effect of a foreign body on each circuit will depend upon the orientation of said circuit with respect to said body, and by observing the detecting instruments associated with the respective circuits, the direction of the foreign body can be determined.

Although these circuits are constructed and arranged so as not to be especially affected by radio waves, yet such waves may cause disturbances, and so the circuits should be designed so as not to respond to radio frequencies.

The wires comprising these circuits are arranged on the outside of the hull of the vessel, and are secured and protected against injury from the sea waves and other causes.

The detecting instruments may be of any suitable kind, including those of the audion type, with any suitable auxiliary circuits. Any suitable amplifying arrangements may be employed.

Suitable means are employed to counteract or compensate for the disturbing magnetic or electromagnetic effects of moving parts or machinery of the vessel carrying the detecting circuits. Suitable means are also used to compensate for the effect of the earth's magnetic field on the detecting circuits.

In the accompanying drawings:

Fig. 1 represents a vessel, in side elevation, with three electric circuits disposed about it in three planes at right angles to each other, two of the circuits passing over masts, with suitable means for generating direct currents, and suitable detecting instruments for indicating changes in current, shown diagrammatically.

Fig. 2 is a top view of the same vessel and circuits.

Fig. 3 is an end view of the same vessel and circuits.

Fig. 3$^a$ is a top sectional view of a portion of the hull of a vessel and attached parts showing a means for protecting and securing electric wires on the outside of the hull.

Fig. 3$^b$ is a front view and Fig. 3$^c$ a side sectional view of the above portion of hull and attached parts.

Fig. 3$^d$ is a top sectional view of a portion of the hull of a vessel and attached parts showing a modified means for securing and protecting wires on the outside of the hull.

Figure 4:
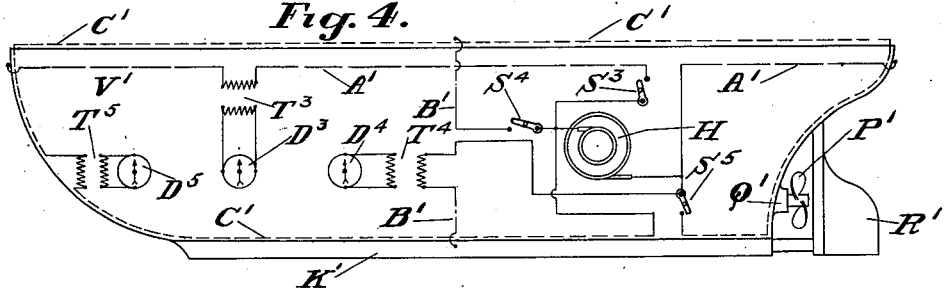

Fig. 4 shows a vessel, in side elevation, with three electric circuits disposed about it in three planes at right angles to each other, all three circuits arranged close to the hull or deck of the vessel, with means for generating alternating currents and suitable indicating or measuring instruments, shown diagrammatically.

Figure 5:
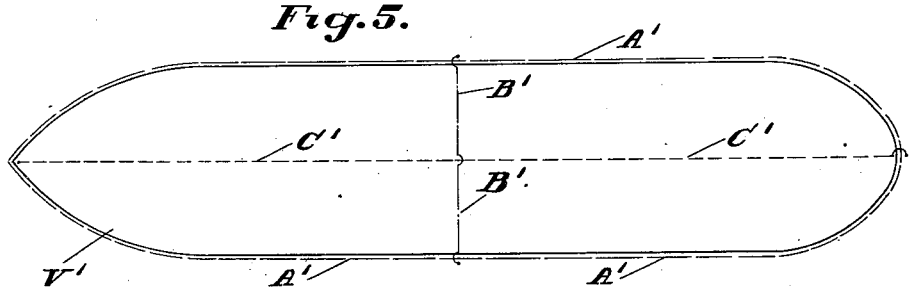

Fig. 5 is a top view of the same vessel and circuits.

Figure 6:
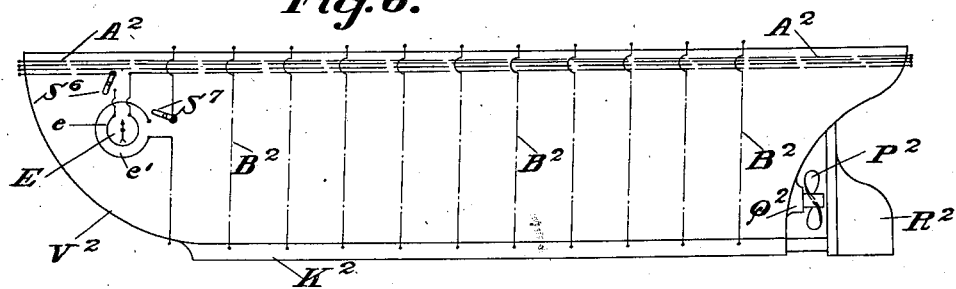

Fig. 6 is a side view of a vessel with two electric circuits disposed about it, each having a number of turns, and another form of indicating instrument shown diagrammatically.

Figure 7:
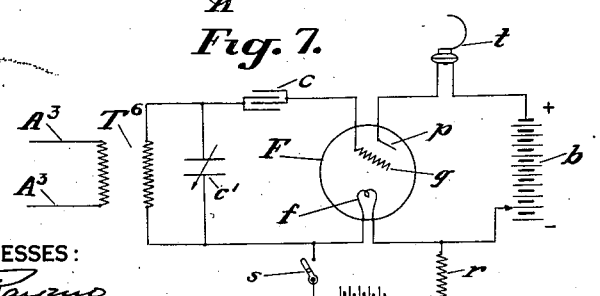

Fig. 7 shows another form of detecting instrument, of the audion type.

Fig. 8 shows diagrammatically a direct current generator, a current indicating or measuring instrument with a compensating coil, and electric circuit and a gyroscopic compass with means for changing the resistance of the circuit.

Fig. 8$^a$ shows another view of the above generator, with means for driving it at a speed proportional to the speed of the vessel.

Figs. 9, 9$^a$ and 9$^b$ show an engine piston and a compensating magnet in three different positions.

Fig. 10 is a side elevation of a rudder, a compensating magnet, and gearing. Figures 10$^a$, 10$^b$ and 10$^c$ are top views of the above rudder and magnet in three different positions.

Fig. 11 is a side view, partly in section, of a propeller and of compensating magnets in a watertight housing or box. Fig. 11$^a$ is an end view of the above propeller and magnets.

In Figures 1, 2 and 3, V is a vessel or ship, with masts M, M' and M$^2$, keel K, rudder R and screw propeller P. A watertight housing or box Q encloses compensating magnets, shown in Figures 11 and 11$^a$.

A, A is an insulated electric circuit running horizontally around the outside of the hull, and having one or more turns, B, B is an insulated electric circuit in a plane approximately at right angles to the length of the vessel, running over a mast or stay and outside the hull and between the keel and the hull or through a hole in the keel. C, C is an insulated electric circuit in a plane approximately parallel to the length of the vessel running over the masts and outside the hull. This circuit is run preferably near, but not outside the cutwater and keel. All these circuits may have one or more turns. G is a direct current generator which can supply current to circuits A, B and C through the reversing switches S, S' and S$^2$ respectively. D, D' and D$^2$ are detecting or indicating instruments, inductively connected to the circuits A, B and C, respectively, through the transformers T, T' and T$^2$. The generator, switches, indicating instruments, transformers and circuits are shown in diagrammatic form, and the circuits are distinguished from each other by different kinds of dashes and dots.

In Figures 3$^a$, 3$^b$ and 3$^c$, U is a portion of the hull of a vessel, B$^3$ B$^3$ are insulated wires forming part of an electric circuit about the vessel, L is a covering strip or piece, having a recess, O, for the wires to fit in, and fastened to the hull by means of the bolts J. L has rounded or beveled edges, so as to offer little resistance to the water. N is packing to keep water out of the recess O.

In Fig. 3$^d$, U is a portion of the hull of a vessel, B$^3$ B$^3$ are insulated wires forming part of an electric circuit about the vessel, W is a groove in the hull, into which the wires fit, N' is packing, fitting into a groove W' wider and shallower than W, I is a strip or piece covering the grooves W and W' and fastened to the hull U by means of bolts J. I has rounded or beveled edges.

In Figures 4 and 5, V' is a vessel or ship, with keel K', rudder R' and screw propeller P'. A watertight box Q' encloses compensating magnets, shown in Figures 11 and 11$^a$. A' A' is an insulated electric circuit running horizontally around the outside of the hull. B' B' is an insulated electric circuit in a plane approximately at right angles to the length of the ship, running around the hull and near or on the deck. C' C' is an insulated electric circuit in a plane approximately parallel to the length of the vessel, running outside the hull and near or on the deck. All these circuits may have one or more turns, and when outside the hull, and especially when under water, they are placed so as to be as secure as possible and to offer the least resistance to passage through the water. H is an alternating current generator, which can supply current to circuits A' B' and C' through the switches S$^3$ S$^4$ and S$^5$ respectively. D$^3$ D$^4$ and D$^5$ are detecting or indicating instruments, inductively connected to the circuits A' B' and C', respectively, through the transformers T$^3$, T$^4$ and T$^5$. The generator, switches, indicating instruments, transformers and circuits are shown in diagrammatic form, and the circuits are distinguished from each other by different kinds of dashes and dots.

In Fig. 6, V$^2$ is a vessel or ship with keel K$^2$, rudder R$^2$ and propeller P$^2$. A watertight box Q$^2$ encloses compensating magnets, shown in Figures 11 and 11$^a$. A$^2$, A$^2$ is an insulated electric circuit running horizontally around the outside of the hull, and having a number of turns. B$^2$ B$^2$ B$^2$ is an insulated electric circuit running around the hull and over the deck and having a number of turns covering a large part of the length of the ship. E is an electric indicating or measuring instrument having two coils, e and e', connected, respectively to circuits A$^2$ and B$^2$ through switches S$^6$ and S$^7$. The indicating instrument, switches and circuits are shown diagrammatically, and the circuits are distinguished from each other by different kinds of dashes and dots. The indicating instrument E can be connected with either circuit A$^2$ or B$^2$ or with both, and in the latter case will act differentially to show the relative strength of the currents in either circuit. Under normal conditions there will be no current in either circuit, but the presence of a foreign body, of magnetic material, in relative motion with vessel V$^2$, will cause currents in circuits A$^2$ and B$^2$, the relative strength of these currents depending upon the direction of the foreign body with respect to circuits A$^2$ and B$^2$.

In Figure 7, A$^3$ A$^3$ are parts of a circuit running around a vessel, as shown in the preceding figures. T$^6$ is a transformer, c and c' are condensers, the latter a variable one. F is an exhausted bulb, f is a filament, g is a grid, and p a plate, all inside the bulb. a and b are batteries, r is a variable resistance, s is a switch, and t a telephone receiver. The arrangement of elements here shown constitutes one form of the audion type of detectors, but any other suitable arrangement of elements and circuits may be employed.

In Fig. 8, Y is a gyroscopic compass; 1 and 2 are light insulated rods attached thereto and carrying electric contacts 3, 4, 5 and 6. Contact 3 is connected by circuit 7 with contact 5, and contact 4 is connected by circuit 8 with contact 6. 9 is an outer circular contact strip extending over a little less than 180 degrees, and connected with an inner circular contact strip 11. 10 is an outer circular contact strip having the same radius as 9 and also extending over a little less than 180 degrees, and it is connected with the inner circular contact strip 12 having the same radius as 11. 13 and 14 are resistances arranged circularly, or with their contact points arranged circularly, and connected with each other at 15 and 16. 17, 18 and 19 are circuits connecting the apparatus just described with the compensating coil 21 about the galvanometer 20, and the direct current generator 22. The leads A$^4$, A$^4$ are connected with one of the circuits about a vessel as already described.

In Fig. 8$^a$, 22 is a direct current generator, with poles 23 and 24, shaft 25 and pulley 26, the latter being connected by belt 27 with pulley 28 on shaft 29, which is the propeller shaft of the vessel or is so connected with the main shaft that its speed is proportional to the speed of the vessel.

The object of the apparatus and devices shown in Figures 8 and 8$^a$ is to compensate for the effects of the earth's magnetic field upon the detecting circuits on the vessel. These effects will depend upon the speed of the vessel and the course she is steering. Generally speaking, when the vessel is on a magnetic north or south course, the effect of the earth's field will be a minimum, and when the vessel is on a magnetic east or west course the effect will be a maximum. The effects will also increase with the speed of the vessel. The indicating or measuring instrument 20 is connected with one of the detecting circuits about the vessel, in which circuits currents are induced as the vessel moves in the earth's magnetic field. In order to counteract, or compensate for the action of these currents on the instrument 20, a compensating coil 21 is associated with said instrument, the current in the compensating coil 21 being such as to counteract the effects of the current in the regular coil of 20 due to the earth's field.

The compensating current is generated by a dynamo 22, whose speed is proportional to the speed of the vessel, and this current is regulated by the resistances 13 and 14, which are controlled by the gyroscopic compass Y. These resistances are connected together at 15 and 16, as shown, so that the maximum resistance is in circuit when the contact points 5 and 6 are in the position shown in the figure, or in the diametrically opposite position, and the minimum resistance is in circuit when said contact points are at the positions 15 and 16.

When the vessel is on a magnetic north course, the points 3 and 4 do not make contact with the circular contact strips 9, 10, 11, and 12, and the circuit is open. As the vessel deviates from a north course the circular contact strips move relatively to the points 3 and 4 which are under control of the compass Y, and contact is made. At the same time the points 5 and 6 are at or near the position of maximum resistance of 13 and 14, and only a small current flows through the circuit in which the compensating coil 21 is included. As the vessel approaches an east or a west course, the resistances 13 and 14 move relatively to the points 5 and 6, and the resistance decreases until it reaches a minimum when the vessel is headed east or west. In this position the maximum compensating current flows through the compensating coil 21. As the vessel approaches a south course, the resistance increases and the current in the compensating coil diminishes until it reaches a minimum when the south course is reached.

As the direction of the current due to the earth's field will be different for easterly and westerly courses, the direction of the compensating current must be correspondingly changed. This is accomplished by means of the interrupted circular contact strips 9, 10, 11 and 12, as shown, for when the vessel passes from an easterly to a westerly course, or vice versa, the polarity of the contact pieces 3 and 4 changes.

In Figures 9, 9ª and 9ᵇ, 30 is a crank shaft, 31 and 32 are cranks, set at 180 degrees apart, 33 is a piston rod, 34 a piston moving in the cylinder 35, 36 is a rod and 37 a magnet or magnetic body. These figures are largely diagrammatic and a number of details have been omitted. The magnet is small in mass compared with the piston, but is equal to it in magnetic effect upon outside bodies and circuits. The magnet always moves in a direction opposite to that of the piston, and so counterbalances the magnetic effect of the latter on outside bodies and circuits.

In Figures 10, 10ª, 10ᵇ and 10ᶜ, $R^3$ is a rudder, 38 is a rudder post, 39 is a magnet or magnetic body, 40, 41 42 and 43 are gearing and gear wheels which move the rudder and the magnet in such a way that when the rudder turns in one direction, the magnet turns in the other direction. The magnet is small in mass compared with the rudder, but equal to it in magnetic effect upon outside bodies and circuits, and as it moves in the opposite direction to the rudder, it will counterbalance, or compensate for, its magnetic effect on outside bodies and circuits.

In Figures 11 and 11ª, $P^3$ is a screw propeller, 49, 49, 49, 49 are magnets or magnetic bodies, 44 is a propeller shaft and 45 is a sleeve carrying the magnets 49 and turning in an opposite direction to the propeller shaft, and actuated by gearing, or other suitable means, not shown. $Q^3$ is a watertight box or housing enclosing the magnets, and attached to the hull of the vessel, 48, by bolts 47. Watertight packing is shown at 46. The magnets are small in mass compared with the propeller blades, but equal to them in magnetic effect upon outside bodies or circuits, and as they turn in a direction opposite to that of the propeller, they will counterbalance its magnetic effect upon other bodies or circuits.

Other moving parts may be similarly counterbalanced magnetically.

The vessels on which I dispose my circuits are preferably composed largely of magnetic material, but they may be of other material. Direct current, or alternating current can be used with any of the arrangements of circuits shown in Figures 1, 2, 3, 4, 5 and 6, or with any other suitable arrangement of circuits or said circuits may have no current flowing in them under normal conditions, and any of the detecting instruments shown, or any other suitable ones, can be used in connection with any of my circuits. These instruments may be directly connected with the circuits, or may be connected with them through transformers or through condensers, as may be most suitable for any given conditions.

In general, the figures are diagrammatic and show the objects described in conventional forms, and I do not confine myself to the exact constructions and arrangements here shown, but may employ any suitable constructions and arrangements for my purposes.

What I here claim as my invention and desire to secure by Letters Patent is:

1. Means for ascertaining the direction of magnetic bodies at a distance, comprising a vessel, a plurality of electric circuits in different planes disposed around the outside of said vessel, and indicating instruments associated with said circuits.

2. Means for ascertaining the direction of metallic bodies at a distance, comprising a vessel, a plurality of electric circuits in different planes disposed around the outside of said vessel, and indicating instruments associated with said circuits.

3. Means for detecting the presence of magnetic bodies at a distance, comprising a vessel, electric circuits substantially surrounding said vessel, indicating instruments associated with said circuits, and means for compensating the effect upon said circuits of moving magnetic bodies on board said vessel.

4. Means for detecting the presence of magnetic bodies at a distance, comprising a vessel, electric circuits disposed around said vessel, detecting instruments associated with said circuits, and means for compensating the effect of the earth's magnetic field on said circuits.

5. Means for detecting the presence of magnetic bodies at a distance, comprising a ship having a hull composed largely of magnetic material, electric circuits disposed about said ship, means for causing current to flow through said circuits, and means for detecting variation in the current in said circuits.

6. Means for detecting submerged magnetic bodies, comprising a detecting vessel, a magnetizing coil surrounding said vessel, means for passing current through said coil, a detecting coil surrounding said vessel, and an electric indicator connected to said detecting coil.

7. A method of detecting the presence of magnetic bodies at a distance, which consists in causing relative motion between said bodies and a vessel carrying large electric circuits said vessel having a hull composed largely of magnetic material, in causing currents to flow through said circuits, and in indicating changes in said currents on detecting instruments.

8. A method of detecting the presence of metallic bodies at a distance, which consists in causing relative motion between said bodies and a vessel carrying large electric circuits said vessel having a hull composed largely of magnetic material, in causing currents to flow through said circuits, in causing variations in said currents by the relative motion between said bodies and said vessel, and in indicating changes in said currents on detecting instruments.

9. A method of detecting the presence of magnetic bodies at a distance, which consists in causing relative motion between said bodies and a vessel carrying large electric circuits, in causing currents to flow through said circuits in indicating changes in said currents on detecting instruments, and in counterbalancing the effect of local magnetic disturbances.

10. A method of detecting the presence of metallic bodies at a distance, which consists in causing relative motion between said bodies and a vessel carrying large electric circuits, in causing currents to flow through said circuits in indicating changes in said currents on detecting instruments, and in counterbalancing the effect of local magnetic disturbances.

11. A method of detecting the presence of magnetic bodies at a distance, which consists in causing relative motion between said bodies and a vessel carrying large electric circuits, in causing currents to flow through said circuits, in indicating changes in said currents on detecting instruments, and in compensating for the effect of the earth's magnetic field.

12. A method of detecting the presence of metallic bodies at a distance, which consists in causing relative motion between said bodies and a vessel carrying large electric circuits, in causing currents to flow through said circuits, in indicating changes in said currents on detecting instruments, and in compensating for the effect of the earth's magnetic field.

13. Means for detecting bodies of magnetic material under water, comprising a vessel, electric circuits surrounding said vessel, detecting apparatus connected with said circuits, magnets for counteracting the disturbing effects of moving parts on board said vessel, and mean for compensating for the action of the earth's magnetic field on said circuits.

14. In combination, a vessel, electric circuits surrounding said vessel, detecting apparatus connected with said circuits, means for magnetically counterbalancing moving parts of said vessel, and means for compensating for the earth's magnetism.

15. Means for compensating for the effect of the earth's magnetic field on circuits on board a vessel, comprising an indicating instrument connected with said circuits, a compensating coil on said indicating instrument, a compass, a resistance controlled by said compass and in circuit with said compensating coil, and an electric generator in circuit with said resistance and said compensating coil, and driven at a speed proportional to the speed of the vessel.

16. Means for counteracting the effect of the earth's magnetic field on a current indicating instrument associated with circuits on board a vessel, comprising a compensating coil associated with said instrument, a source of electric current which generates current of a strength proportional to the speed of the vessel, and means for modifying the current in accordance with the course of the vessel.

17. The method of detecting submerged magnetic bodies, which consists in surrounding a vessel of magnetic material with a magnetizing coil and a detecting coil, passing the current through the magnetizing coil, thereby making the vessel an electromagnet; putting the detecting vessel and the submerged magnetic body into relative motion with one another and in proximity to each other, whereby the amount of magnetic flux passing through the body of the detecting vessel will be varied, and utilizing said variation in magnetic flux to generate a current in the detecting coil, and observing the variation in intensity of the indications produced by said current.

In testimony whereof, I have signed my name to this specification, in the presence of two subscribing witnesses, this 13th day of July, 1917.

JOHN H. CUNTZ.

Witnesses:
HERMAN F. CUNTZ,
WILLIAM B. WALDO.